United States Patent
Costanzo et al.

(10) Patent No.: US 9,156,629 B2
(45) Date of Patent: Oct. 13, 2015

(54) DIVERTING CONVEYOR WITH BIDIRECTIONAL ASSIST ROLLER

(71) Applicant: Laitram, L.L.C., Harahan, LA (US)

(72) Inventors: Mark Costanzo, River Ridge, LA (US); David Herbert Myers, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 157 days.

(21) Appl. No.: 13/892,249

(22) Filed: May 11, 2013

(65) Prior Publication Data

US 2014/0332343 A1  Nov. 13, 2014

(51) Int. Cl.
| | |
|---|---|
| B65G 47/71 | (2006.01) |
| B65G 17/24 | (2006.01) |
| B65G 47/34 | (2006.01) |
| B65G 47/53 | (2006.01) |
| B65G 47/88 | (2006.01) |

(52) U.S. Cl.
CPC ............... *B65G 47/71* (2013.01); *B65G 17/24* (2013.01); *B65G 47/8815* (2013.01)

(58) Field of Classification Search
None
See application file for complete search history.

(56) References Cited

U.S. PATENT DOCUMENTS

| | | | |
|---|---|---|---|
| 3,782,527 A * | 1/1974 | Petershack | 198/370.09 |
| 5,971,132 A | 10/1999 | Bonnet | |
| 6,073,747 A | 6/2000 | Takino et al. | |
| 6,182,813 B1 * | 2/2001 | Bonnet | 198/370.09 |
| 7,017,730 B2 | 3/2006 | Mills et al. | |
| 7,506,751 B2 * | 3/2009 | Fourney | 198/782 |
| 7,533,766 B1 | 5/2009 | Fourney | |
| 8,157,083 B2 | 4/2012 | Bogle | |
| 2006/0070855 A1 * | 4/2006 | Lemm | 198/779 |
| 2007/0221471 A1 | 9/2007 | Fourney et al. | |

OTHER PUBLICATIONS

International Search Report and Written Opinion of the International Searching Authority, PCT/US2014/036420, mailed Sep. 12, 2014, European Patent Office, Rijswijk, NL.

\* cited by examiner

*Primary Examiner* — Kavel Singh
(74) *Attorney, Agent, or Firm* — James T. Cronvich

(57) ABSTRACT

A sorting conveyor including a diverting conveyor and a bidirectional assist roller to help sort articles over the side of the diverting conveyor. The diverting conveyor includes, in one version, a conveyor belt with diverting rollers selectively actuated to push articles toward a side of the diverting conveyor. The bidirectional assist roller rotates on an axis parallel to the main conveying direction. As articles to be diverted reach the side of the diverting conveyor, the bidirectional roller rotates in a direction to assist articles over the side of the diverting conveyor and the bidirectional roller and onto an exit conveyor. When the diverting rollers are not actuated, the bidirectional roller rotates in the opposite direction to prevent articles from exiting the side of the diverting conveyor. In some instances, the bidirectional roller can be raised above the level of the diverting rollers to further block articles not selected for sorting from exiting over the side and onto the exit conveyor.

17 Claims, 4 Drawing Sheets

DIVERTING CONVEYOR WITH BIDIRECTIONAL ASSIST ROLLER

BACKGROUND

The invention relates generally to power-driven conveyors and more particularly to sortation conveyors.

Sorting conveyor systems are used to selectively divert articles traveling along a main conveyor onto an exit conveyor or chute. In one conventional system, the main conveyor includes a conveyor belt having rollers arranged to rotate in a direction transverse to the direction of belt travel to divert articles atop the rollers toward and off a side of the belt and onto an exit conveyor. If the belt rollers are recessed inward of the side of the belt too far or if the bottom surface of the article is not flat and does not make good contact with the rollers in the belt, the force the rollers can provide to transfer an article over the side onto the exit conveyor may not be sufficient, and the article will not transfer off. Sometimes, an article not meant for transfer can coast on the rollers toward the first side. The article's momentum can be great enough to carry it over the side and onto the exit conveyor.

SUMMARY

A conveyor embodying features of the invention comprises a diverting conveyor that extends longitudinally in a conveying direction and laterally in width from a first side to a second side. The diverting conveyor includes means for selectively diverting articles toward the first side. An exit conveyor is positioned adjacent the first side to receive articles diverted by the diverting conveyor. A bidirectional roller disposed between the first side of the diverting conveyor and the exit conveyor has an axis of rotation parallel to the conveying direction. The bidirectional roller is rotated in a first direction to assist the selectively actuated diverting conveyor in transferring articles over the bidirectional roller and onto the exit conveyor and in an opposite second direction to prevent articles from transferring from the diverting conveyor to the exit conveyor.

Another version of a conveyor comprises a conveyor belt that extends laterally in width from a first side to a second side. Diverting rollers in the conveyor belt support conveyed articles. A drive drives the conveyor belt in a direction of belt travel. A diverting-roller actuator coupled to the diverting rollers selectively actuates the diverting rollers to rotate. The rotating diverting rollers divert articles atop the rollers laterally across the width of the conveyor belt toward the first side. An exit conveyor positioned adjacent to the first side receives articles diverted over the first side. A bidirectional roller having an axis of rotation parallel to the direction of belt travel is disposed between the first side of the conveyor belt and the exit conveyor. The bidirectional roller is rotated in a first direction to assist the selectively actuated diverting rollers in transferring articles over the first side onto the exit conveyor and in an opposite second direction to prevent articles from transferring from the conveyor belt to the exit conveyor.

DETAILED DESCRIPTION

Figure 1:
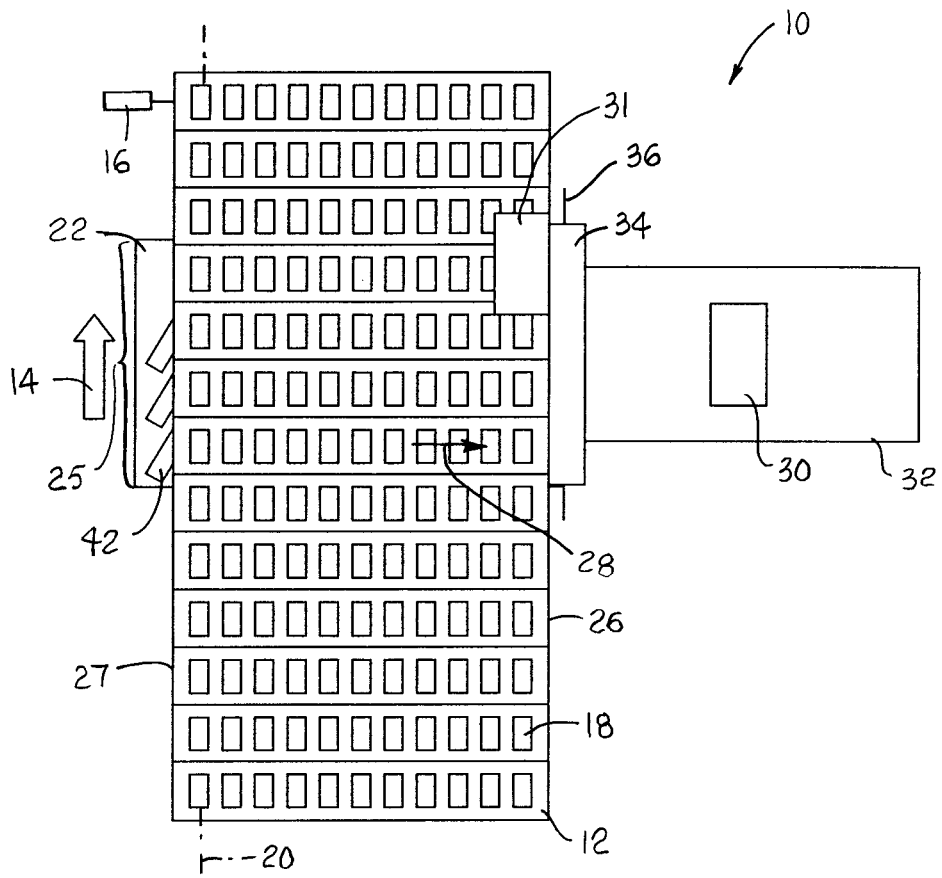
FIG. 1 is a top plan view of a portion of a sorting conveyor embodying features of the invention including a bidirectional assist roller.

A sorting conveyor embodying features of the invention is shown in FIG. 1. The sorting conveyor 10 includes a conveyor belt 12 driven in a direction of belt travel 14 by a motor drive 16. The conveyor belt 12 has a plurality of diverting rollers 18 that are rotatable on axes 20 parallel to the direction of belt travel 14, i.e., the main conveying direction. The rollers extend through the thickness of the conveyor belt past the belt's outer and inner sides. One example of such a conveyor belt is the INTRALOX® Series 7000 belt manufactured and sold by Intralox, L.L.C. of Harahan, La., U.S.A. The diverting rollers 18 are actuated by a diverting-roller actuator 22 providing rolling bearing surfaces to the diverting rollers along a portion of the conveyor belt's upper carryway. In this version, the actuators 22 comprises a frame supporting a series of passive elongated actuating rollers 42 oriented at an angle relative to the diverting rollers 18. As the drive 16 drives the conveyor belt, the diverting rollers roll on the actuating rollers 42 in an actuation, or diverting, zone 25. The rolling contact causes the diverting rollers 18 passing through the actuation zone 25 to rotate toward a first side 26 and away from an opposite second side 27 of the conveyor belt 12 in a divert direction 28. Thus, the conveyor belt 12 serves as a diverting conveyor and the diverting-roller actuator is one means for selectively diverting articles. The article 30 supported atop the actuated diverting rollers 18 is transferred or sorted over the first side 26 of the conveyor onto an exit conveyor 32, such as a chute, a table, a roller conveyor, or a belt conveyor. Examples of a diverting conveyor and means for selectively diverting articles are described in U.S. Pat. No. 7,506,751, "Conveyor Systems for Diverting Objects," Mar. 24, 2009. The entire disclosure of that patent is incorporated into this description by reference.

Figure 2:
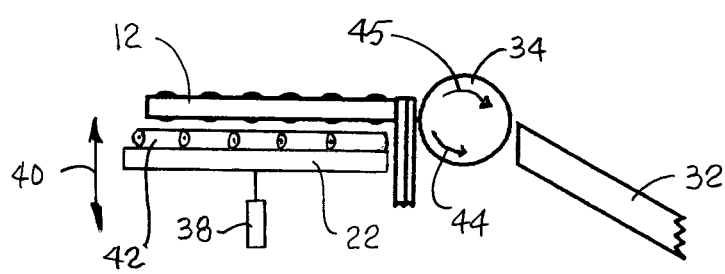
FIG. 2 is an elevation view of the conveyor of FIG. 1.

A bidirectional induct roller 34 whose axis of rotation 36 is parallel to the direction of belt travel 14 is disposed between the side 26 of the conveyor belt 12 and the exit conveyor 32 is also shown in FIG. 2. The diverting-roller actuator 22 is driven up and down by a linear actuator 38 as indicated by arrow 40. (As one alternative, the actuating rollers may be an array of caster rollers swiveled about a vertical axis by an actuator from an angled axial orientation actuating the diverting rollers to an orientation in which their axes of rotation are perpendicular to the direction of belt travel to allow the diverting rollers to roll over them without rotation.) In FIG. 2, the diverting-roller actuator is shown in a lowered, non-actuating position. In this position, the actuator's actuating rollers 42, which are angled relative to the diverting rollers 18, do not contact the diverting rollers. An article 31 sitting atop non-actuated diverting rollers rides along with the conveyor belt 12 in the direction of belt travel 14 without being diverted. To prevent the article 31 from accidentally transferring to the exit conveyor 32, the bidirectional roller 34 is rotated counterclockwise in the direction of arrow 44 to urge articles that contact it from traveling across to the exit conveyor. The bidirectional roller 34 is rotated counterclockwise whenever the diverting-roller actuator 22 is in its lowered, non-actuating position. When the diverting-roller actuator 22 is raised to the actuating position in contact with the diverting rollers 18, the direction of rotation of the bidirectional roller 34 is reversed to clockwise as indicated by arrow 45. The clockwise rotation assists the transfer of articles from the conveyor belt, across the bidirectional roller 34, and onto the exit conveyor 32.

Figure 3:
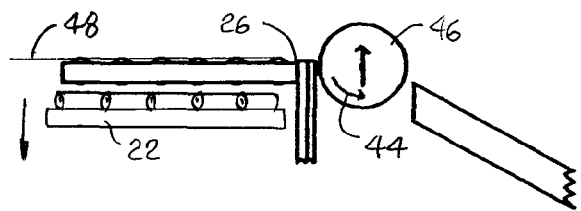
FIG. 3 is an elevation view of another version of a conveyor as in FIG. 1 showing a bidirectional roller in a raised position.
Figure 4:
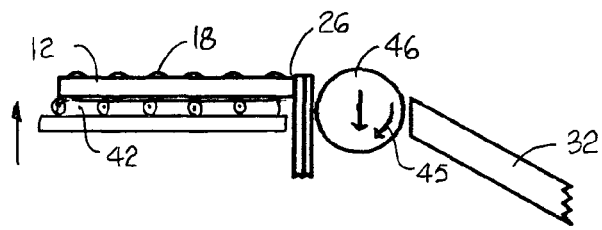
FIG. 4 is an elevation view of the conveyor of FIG. 3 with the bidirectional roller in a lowered position.

Another version of the bidirectional roller is shown in FIGS. 3 and 4. In FIG. 3, a bidirectional roller 46 is shown in a raised, blocking position above the level 48 of the tops of the conveyor belt's diverting rollers 18. In the raised position, the bidirectional roller rotates counterclockwise 44. While the bidirectional roller 46 is raised, the diverting-roller actuator 22 is lowered so that the diverting rollers 18 do not rotate and divert articles. The raised bidirectional roller and its counterclockwise rotation prevent an article from transferring over the first side 26. In FIG. 4, the bidirectional roller 46 is shown in a lowered position and rotating clockwise 45. The horizontal tangent at the top of the bidirectional roller 46 is substantially collinear with the level of the tops of the diverting rollers 18. The diverting-roller actuator 22 is simultaneously raised to its actuated position. The diverting rollers rotate on the actuating rollers 42 as the conveyor belt 12 advances in the direction of belt travel. Articles atop the diverting rollers 18 in the actuation zone are diverted across the width of the belt. As the articles are pushed past the side 26, the clockwise rotation of the bidirectional roller 46 draws the articles over the roller's outer surface and onto the exit conveyor 32. The bidirectional roller 46 is mounted in the frame (not shown) of the diverting conveyor or of the exit conveyor or chute and is raised and lowered by a conventional linear actuator (not shown). The bidirectional rollers 34, 46 of FIGS. 2-4 are powered rollers driven directly by external or self-contained motors.

Figure 5:
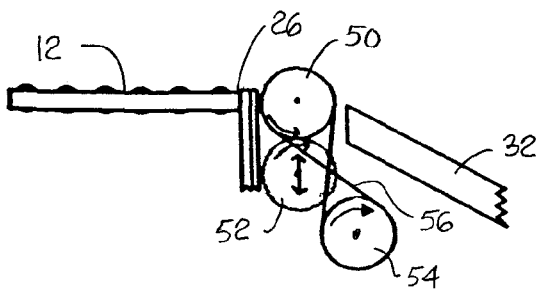
FIG. 5 is an elevation view of another version of a conveyor as in FIG. 1 showing a bidirectional roller driven by a powered roller and a passive roller.
Figure 6:
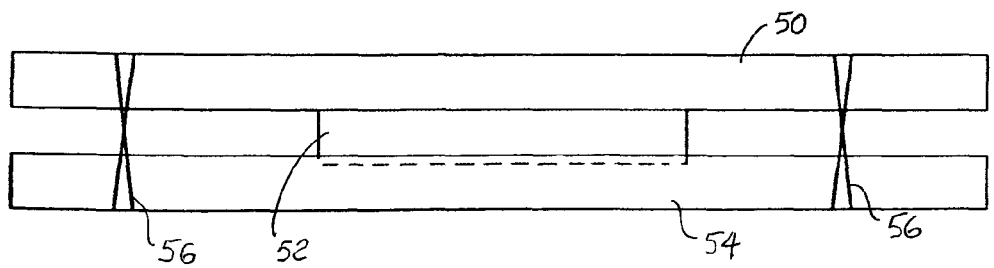
FIG. 6 is a side elevation view of the rollers of the conveyor of FIG. 5.

FIGS. 5 and 6 show a bidirectional roller 50 that is a passive roller, such as a freely rotatable gravity roller. A powered roller 52 is movable between a first position (shown in FIG. 5) contacting the bidirectional roller 50 and a second position contacting a second passive roller 54. The two passive rollers 50, 54 are joined by a pair of belts, or bands 56, so that they rotate together in opposite directions. When the powered roller 52 is rotated clockwise and is in contact with the bidirectional roller 50 as in FIG. 5, the powered roller rotates the bidirectional roller counterclockwise to prevent articles from transferring off the side 26 of the conveyor belt 12. When the powered roller 52 is moved instead into contact with the second passive roller 54, the powered roller rotates the second passive roller counterclockwise. The cross-connected belt 56 causes the bidirectional roller 50 to rotate clockwise and assist articles being diverted to the side 26 over the bidirectional roller and onto the exit conveyor 32. The powered roller 52 is mounted to a movable frame (not shown) that translates between the two passive rollers 50, 54 to put the powered roller into frictional contact with one of the passive rollers or the other. In this version, the powered roller needs to be rotated in only one direction by a motor.

To improve the frictional contact between the bidirectional roller and the articles being diverted off the conveyor, the outside surface of the roller can be made of a high-friction material, such as an elastomer or rubber material.

Figure 7:
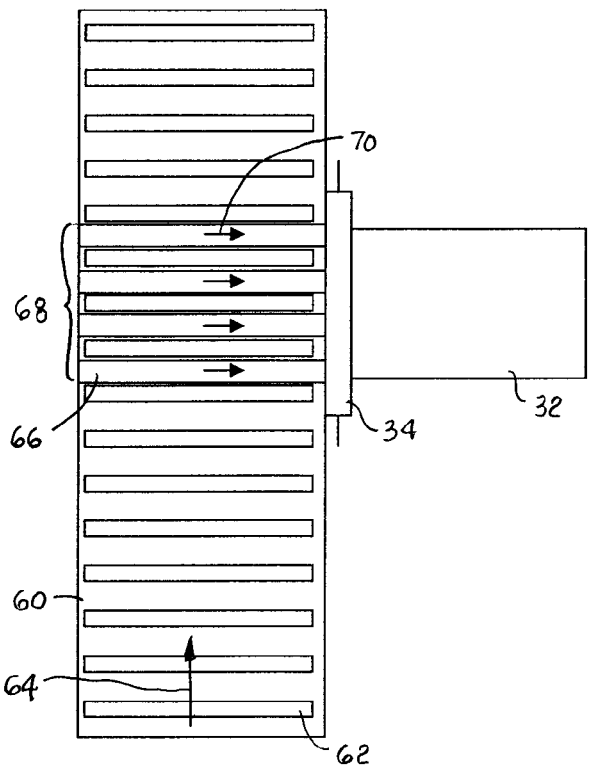
FIG. 7 is a top plan view of a cross-belt sorter usable with a bidirectional assist roller as in FIG. 1.

Other diverting conveyors besides the roller-belt conveyor of FIGS. 1-5 may be used with the bidirectional assist roller. For example, FIG. 7 shows a roller conveyor 60 constructed of a series of parallel conveying rollers 62 individually powered or powered as a group to rotate in the conveying direction 64. A group of diverting belts 66 disposed in the gaps between consecutive conveying rollers in a diverting zone 68 adjacent the exit conveyor 32 are selectively actuated to run in the direction of arrows 70 to divert articles across the bidirectional roller 34 and onto the exit conveyor. When actuated, the belts 66 are also conventionally raised slightly above the top level of the conveying rollers 62 to support the articles. When an article not destined for the exit conveyor reaches the diverting zone 68, the belts are stopped and lowered below the top level of the conveying rollers. Thus, the selectively actuated diverting belts constitute another example of means for selectively diverting articles. This kind of diverting conveyor is one example of a cross-belt sorter. The raising and lowering and the direction of rotation of the bidirectional roller 34 is coordinated with the actuation of the diverting belts.

Figure 8:
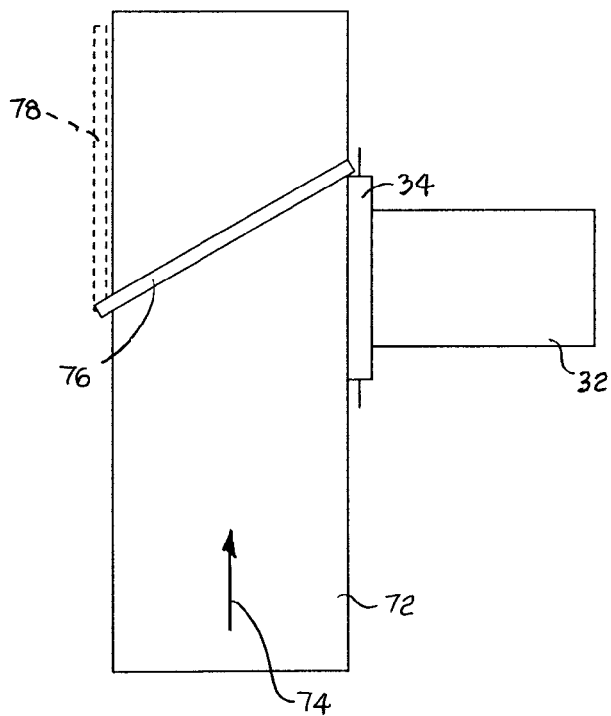
FIG. 8 is a top plan view of a retractable-gate sorter usable with a bidirectional assist roller as in FIG. 1.

Another example of a diverting conveyor usable with the bidirectional assist roller is shown in FIG. 8. The diverting conveyor 72 can be constructed with a flat-top belt, a roller belt, powered rollers, or any conveyor capable of conveying articles in a conveying direction 74. In this example, the means for selectively diverting articles includes a retractable gate 76 selectively movable from a blocking position across the width of the diverting conveyor adjacent the exit conveyor 32 to an unblocking, retracted position 78 allowing articles to pass with diversion. In the blocking position, the gate plows articles along its surface, onto the bidirectional roller and the exit conveyor 32. The raising and lowering and the direction of rotation of the bidirectional roller 34 is coordinated with the actuation of the gate.

Figure 9:
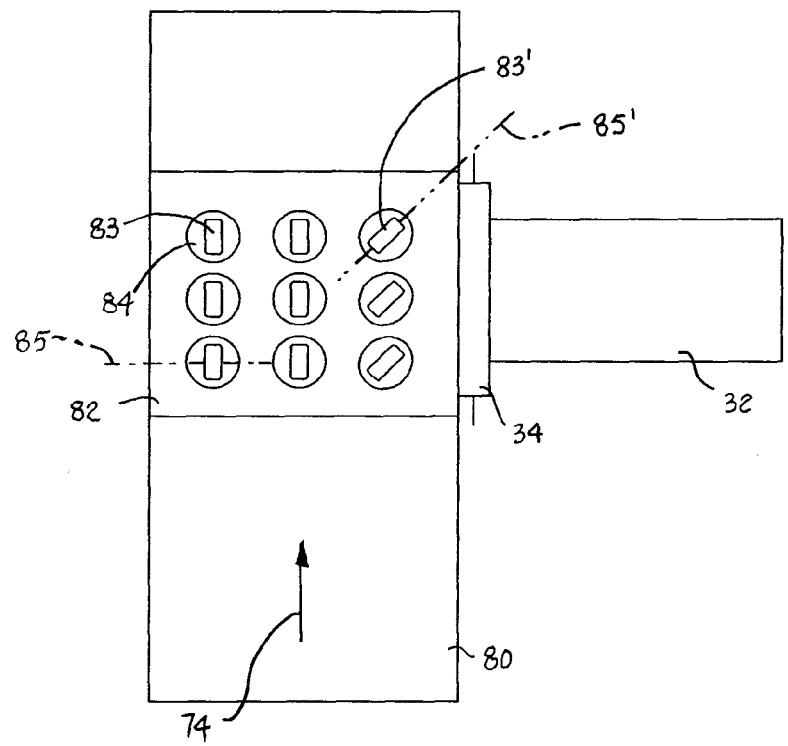
FIG. 9 is a top plan view of a swivel caster-roller sorter usable with a bidirectional assist roller as in FIG. 1.
Figure 10:
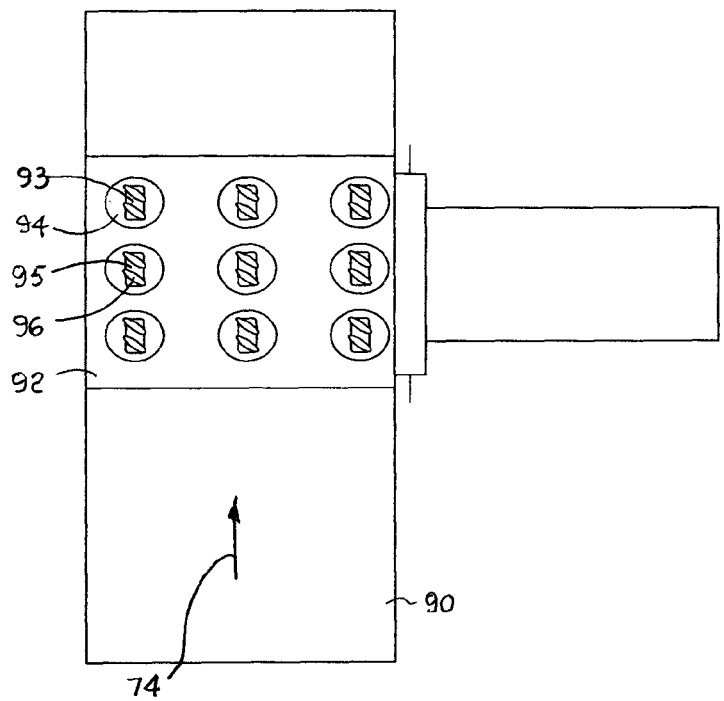
FIG. 10 is a top plan view of a swivel multi-wheel sorter usable with a bidirectional assist roller as in FIG. 1.

The diverting conveyors 80, 90 in FIGS. 9 and 10 include swivel diverters 82, 92 as means for selectively diverting articles. The diverting conveyors can be constructed with a flat-top belt, a roller belt, powered rollers, or any conveyor capable of conveying articles in a conveying direction 74. In FIG. 9, the swivel diverter 82 includes a plurality of diverting rollers 83 mounted in holders 84 that can be swiveled about a vertical axis (out of the page in FIG. 9) to change the orientation angle of the diverting rollers. When all the rollers are oriented in the same direction as the roller 83, i.e., with their axes of rotation 85 perpendicular to the conveying direction 74, no articles are diverted. When the axes of rotation 85' of all the rollers are swiveled to an oblique angle, as for the roller 83', relative to the conveying direction 74, the diverting rollers direct articles to the bidirectional roller 34 and the exit conveyor 32. The swivel diverter 92 of FIG. 10 operates in the same way as that of FIG. 9. The difference is that the rollers mounted in the holders 94 are multi-wheel rollers 93 having multiple small wheels 96 around the periphery of a central hub 95. Wheels opposite each other on the periphery are in contact with each other and driven by a moving conveying surface under the rollers to propel articles in the selected diverting or non-diverting directions. In both swivel diverters, the raising and lowering and the direction of rotation of the bidirectional roller 34 is coordinated with the actuation of the swivel.

Although the invention has been described with respect to a few exemplary versions, other versions are possible. For example, the diverting rollers on the belts need not be oriented with their axes parallel to the direction of belt travel; the rollers could have axes oblique to the direction of belt travel, such as the INTRALOX® Series 400 ARB or Series 400 DARB belt, and be actuated by bearing surfaces provided by a flat plate or actuating rollers with axes parallel to the direction of belt travel. And many different means for raising and lowering the diverting-roller actuator, moving the bidirectional roller, retracting the retractable gate, swiveling the diverting rollers, raising and lowering the diverting belts, or otherwise selectively diverting articles can be used, such as pneumatic, hydraulic, electrical, or electromechanical actuators. Or the diverting rollers may be actuated by non-contact actuation, such as magnetic or inductive. All the diverting conveyors described may be outfitted with multiple diverting zones along the lengths of the conveyors. And some of the versions described are also capable of sorting off both sides. All the means for selectively diverting articles include sensors for sensing the positions of articles on the conveyor and controllers using the position data and programmed to control the actuators according to predetermined criteria to selectively divert an article when it is in a diverting zone. So, as these few examples suggest, the scope of the claims is not meant to be limited by the details of the exemplary versions.

What is claimed is:

1. A conveyor comprising:
   a diverting conveyor extending longitudinally in a conveying direction and laterally in width from a first side to a second side and including means for selectively diverting articles toward the first side;
   an exit conveyor positioned adjacent the first side to receive articles diverted by the diverting conveyor;
   a bidirectional roller disposed between the first side of the diverting conveyor and the exit conveyor and having an axis of rotation parallel to the conveying direction;
   wherein the bidirectional roller is rotated in a first direction to transfer articles diverted to the first side over the bidirectional roller and onto the exit conveyor and in an opposite second direction to prevent articles at the first side from transferring over the bidirectional roller to the exit conveyor
   wherein the conveyor further comprises an actuator raising and lowering the bidirectional roller between a lowered position when the bidirectional roller is rotated in the first direction and a raised position when the bidirectional roller is rotated in the second direction to block articles at the first side of the diverting conveyor from transferring onto the exit conveyor.

2. A conveyor as in claim 1 wherein the diverting conveyor includes a conveyor belt advancing in the conveying direction.

3. A conveyor as in claim 2 wherein the conveyor belt includes a plurality of diverting rollers supporting conveyed articles and wherein the means for selectively diverting articles includes a diverting-roller actuator coupled to the diverting rollers to selectively actuate the diverting rollers to rotate and divert articles atop the diverting rollers laterally across the width of the conveyor belt toward the first side.

4. A conveyor as in claim 3 wherein the diverting rollers have axes parallel to the conveying direction.

5. A conveyor as in claim 3 wherein the diverting rollers have axes oblique to the conveying direction.

6. A conveyor as in claim 1 wherein the diverting conveyor is a cross-belt sorting powered roller conveyor.

7. A conveyor as in claim 1 wherein the means for selectively diverting articles comprises an array of swivel rollers selectively pivotable about a vertical axis between a diverting angle directing articles toward the exit conveyor and a non-diverting angle directing articles in the conveying direction.

8. A conveyor as in claim 7 wherein the swivel rollers are caster rollers.

9. A conveyor as in claim 7 wherein the swivel rollers are multi-wheel rollers.

10. A conveyor as in claim 1 wherein the means for selectively diverting articles comprises a selectively retractable gate movable from a retracted position allowing articles to advance on the diverting conveyor without diversion to the exit conveyor and a blocking position across the width of the diverting conveyor directing blocked articles toward the first side of the diverting conveyor and onto the exit conveyor.

11. A conveyor comprising:
    a conveyor belt extending laterally in width from a first side to a second side and having a plurality of diverting rollers supporting conveyed articles;
    a drive driving the conveyor belt in a direction of belt travel;
    a diverting-roller actuator coupled to the diverting rollers to selectively actuate the diverting rollers to rotate and divert articles atop the diverting rollers laterally across the width of the conveyor belt toward the first side;
    an exit conveyor positioned adjacent the first side to receive articles diverted over the first side of the conveyor belt;
    a bidirectional roller disposed between the first side of the conveyor belt and the exit conveyor and having an axis of rotation parallel to the direction of belt travel;
    wherein the bidirectional roller is rotated in a first direction to transfer articles diverted to the first side over the bidirectional roller and onto the exit conveyor and in an opposite second direction to prevent articles at the first side from transferring over the bidirectional roller to the exit conveyor
    wherein the conveyor further comprises an actuator raising and lowering the bidirectional roller between a lowered position when the bidirectional roller is rotated in the first direction and a raised position above the level of the diverting rollers when the bidirectional roller is rotated in the second direction to block articles on the conveyor belt from transferring onto the exit conveyor.

12. A conveyor as in claim 11 wherein the bidirectional roller is a powered roller.

13. A conveyor as in claim 11 further comprising a powered roller and wherein the bidirectional roller is a passive roller rotated by the powered roller.

14. A conveyor as in claim 13 further comprising a second passive roller and a belt trained around the second passive roller and the bidirectional roller so that the second passive roller and the bidirectional roller rotate in opposite directions and wherein the powered roller is selectively movable from a first position contacting the bidirectional roller to rotate it in one of the first and second directions and a second position contacting the second passive roller to rotate the bidirectional roller in the other of the first and second directions.

15. A conveyor as in claim 11 wherein the bidirectional roller has an outer surface made of a high-friction material.

16. A conveyor as in claim 1 wherein the bidirectional roller is a powered roller.

17. A conveyor as in claim 1 further comprising a powered roller and wherein the bidirectional roller is a passive roller rotated by the powered roller.

* * * * *